United States Patent
Farley et al.

(10) Patent No.: US 12,547,444 B2
(45) Date of Patent: Feb. 10, 2026

(54) LCS LIFE-CYCLE MANAGEMENT SYSTEM

(71) Applicant: Dell Products L.P., Round Rock, TX (US)

(72) Inventors: Douglas Lang Farley, Round Rock, TX (US); Ethan A. Kaley, North Kingstown, RI (US); Geoffrey A. Reid, Littleton, MA (US); Gaurav Chawla, Austin, TX (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 894 days.

(21) Appl. No.: 17/856,606

(22) Filed: Jul. 1, 2022

(65) Prior Publication Data

US 2024/0004697 A1  Jan. 4, 2024

(51) Int. Cl.
*G06F 9/48* (2006.01)
*G06F 9/50* (2006.01)

(52) U.S. Cl.
CPC ............ *G06F 9/485* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 6,467,050 B1 * | 10/2002 | Keung | G06F 11/0709 714/48 |
| 8,312,419 B2 | 11/2012 | Wilcock et al. | |
| 8,412,810 B1 * | 4/2013 | Tompkins | G06F 9/5072 709/224 |
| 10,348,642 B2 * | 7/2019 | Jaisinghani | G06F 9/5061 |
| 10,778,797 B2 * | 9/2020 | Chefalas | H04L 67/561 |
| 11,831,552 B1 * | 11/2023 | Farley | H04L 47/762 |
| 11,902,106 B2 * | 2/2024 | Farley | H04L 41/40 |
| 12,204,946 B2 * | 1/2025 | Dawkins | G06F 9/5027 |
| 2010/0332659 A1 * | 12/2010 | Marowsky-Bree | H04L 43/0817 709/226 |
| 2016/0179411 A1 * | 6/2016 | Connor | G06F 11/1076 714/6.22 |
| 2017/0264565 A1 * | 9/2017 | Gosselin-Harris | H04L 47/782 |
| 2018/0006872 A1 * | 1/2018 | Johnson | H04L 47/70 |
| 2018/0069804 A1 * | 3/2018 | Laplanche | G06F 9/45558 |
| 2019/0312946 A1 * | 10/2019 | Chefalas | H04L 67/561 |
| 2020/0319939 A1 * | 10/2020 | Kim | G06F 9/526 |
| 2022/0350767 A1 * | 11/2022 | McGraw | G06F 11/2007 |
| 2022/0413922 A1 * | 12/2022 | Hamlin | G06F 9/5027 |
| 2025/0238487 A1 * | 7/2025 | Farley | G06F 21/107 |

* cited by examiner

*Primary Examiner* — Hiren P Patel
(74) *Attorney, Agent, or Firm* — Joseph Mencher

(57) ABSTRACT

A Logically Composed System (LCS) life-cycle management system includes an orchestrator device coupled to resource devices. The orchestrator device configures the resource devices to provide an LCS to a client device. The orchestrator device also identifies interdependencies between the resource devices and, based on those interdependencies, determines life-cycle management operations available for the LCS and presents the life-cycle management operations to the client device. When the orchestrator device receives a request to perform a first life-cycle management operation on the LCS, it performs the first life-cycle management operation on the first LCS based on the interdependencies identified between the resource devices.

20 Claims, 12 Drawing Sheets

LCS LIFE-CYCLE MANAGEMENT SYSTEM

BACKGROUND

The present disclosure relates generally to information handling systems, and more particularly to enabling life-cycle management for Logically Composed Systems (LCSs) provided using information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a Bare Metal Server (BMS) system or other resource system known in the art, with resource devices included within and/or outside of that resource system (e.g., processing devices and memory devices on a motherboard in the BMS system used to provide an Operating System (OS) for the LCS, storage devices, networking devices, etc.) used to perform the functionality for the LCS. However, the ability to provide an LCS with any resource devices, as well as the ability to dynamically modify which resource devices are used to provide that LCS, presents issues with regard to the life-cycle management of that LCS. For example, life-cycle management functions such as power cycling, resetting, and restarting may be relatively simple in conventional computing devices such as the server devices discussed above, as the components of the server device are configured in a static manner that allows the shutting down and restarting of those components in a defined initialization sequence relatively straight forward. However, the same or similar life-cycle management functions are such more difficult with LCSs that are composed (and dynamically recomposed) using different resource devices, particularly when resource devices are shared between LCSs. As such, many life-cycle management functions may not be made available to a user of an LCS, and can cause the user to view the LCS as having limited functionality due to that LCS otherwise appearing to the user as a local, integrated system.

Accordingly, it would be desirable to provide an LCS life-cycle management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an orchestrator engine that is configured to: configure a plurality of resource devices to provide a first Logically Composed System (LCS) to a client device; identify one or more interdependencies between the plurality of resource devices; determine, based on the one or more interdependencies identified between the plurality of resource devices, a plurality of life-cycle management operations available for the first LCS; present the plurality of life-cycle management operations to the client device; receive a request to perform a first life-cycle management operation that is included in the plurality of life-cycle management operations on the LCS; and perform, in response to the request and based on the one or more interdependencies identified between the plurality of resource devices, the first life-cycle management operation on the first LCS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
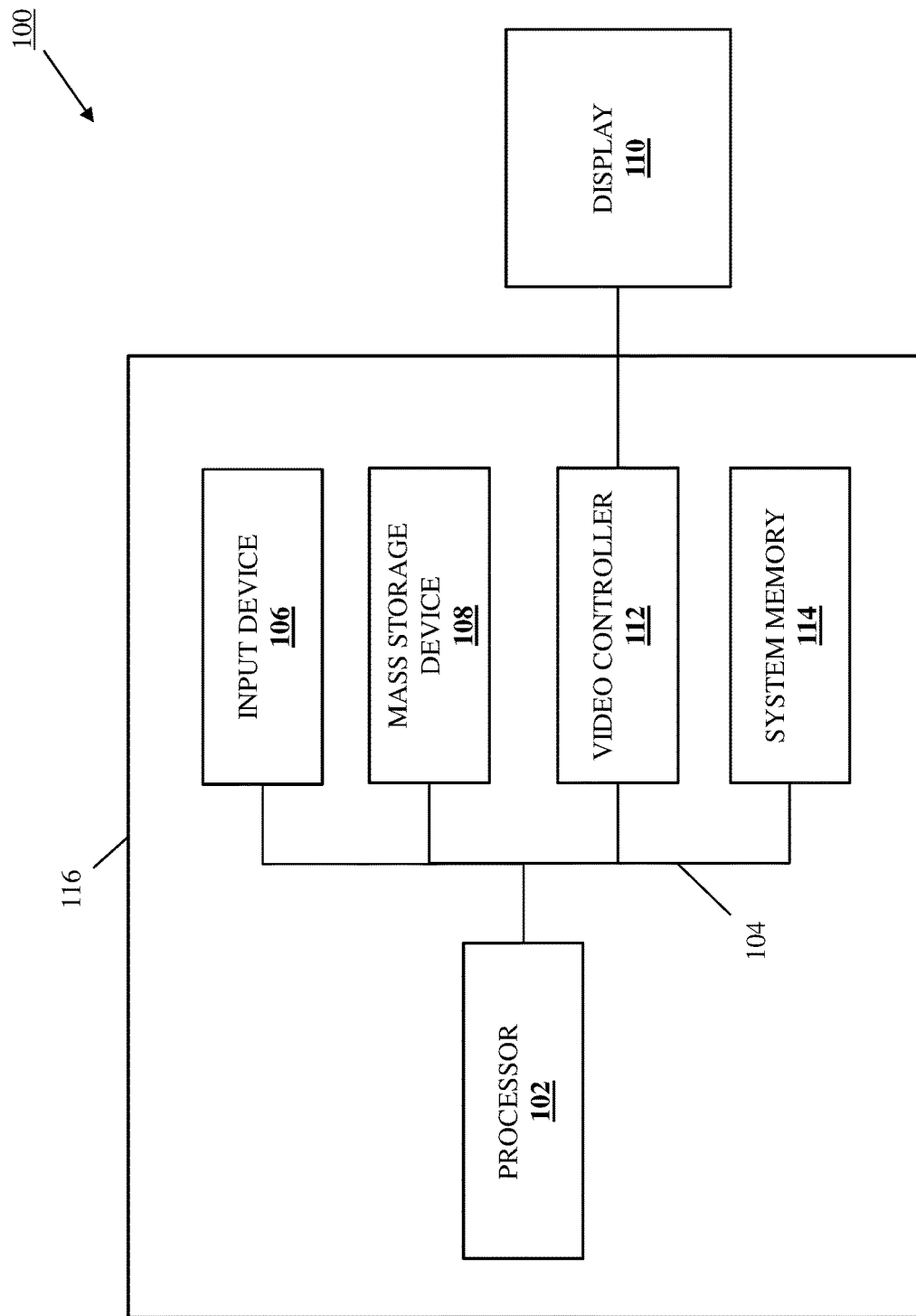
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) life-cycle management systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/ workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
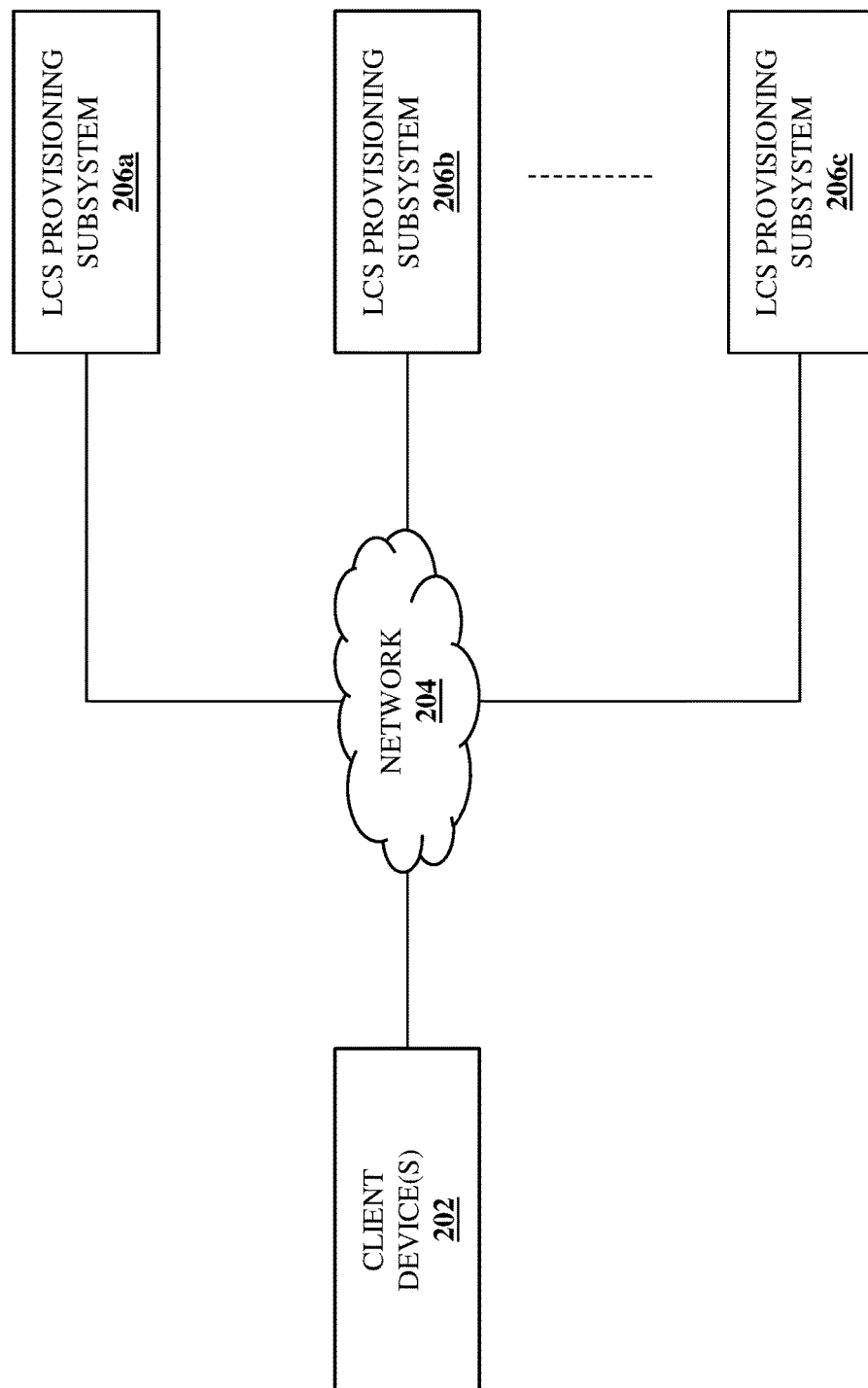
FIG. 2 is a schematic view illustrating an embodiment of an LCS provisioning system.

With reference to FIG. 2, an embodiment of an LCS provisioning system 200 is illustrated that may be utilized with the LCS life-cycle management systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/ notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
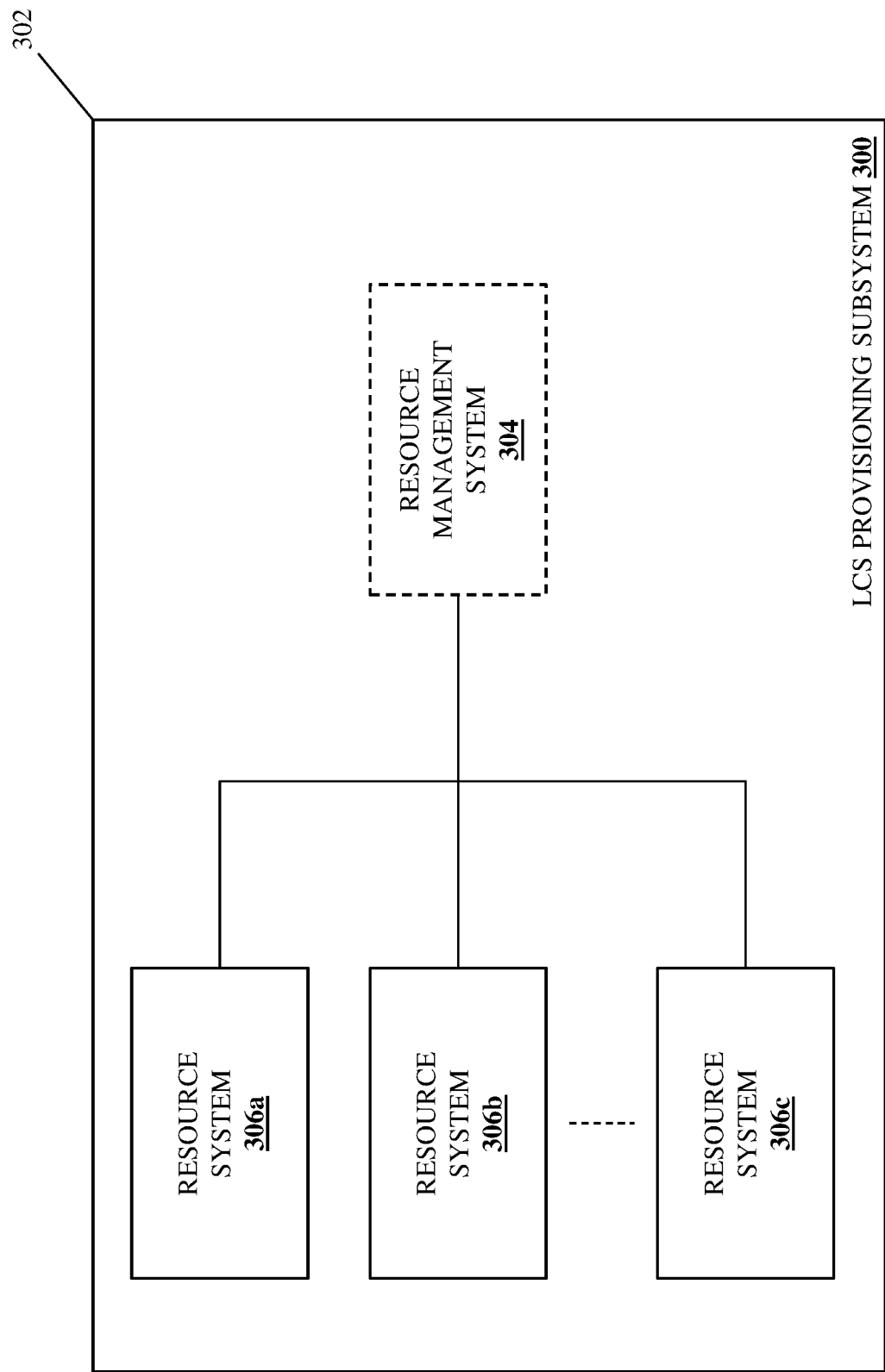
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, and which may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
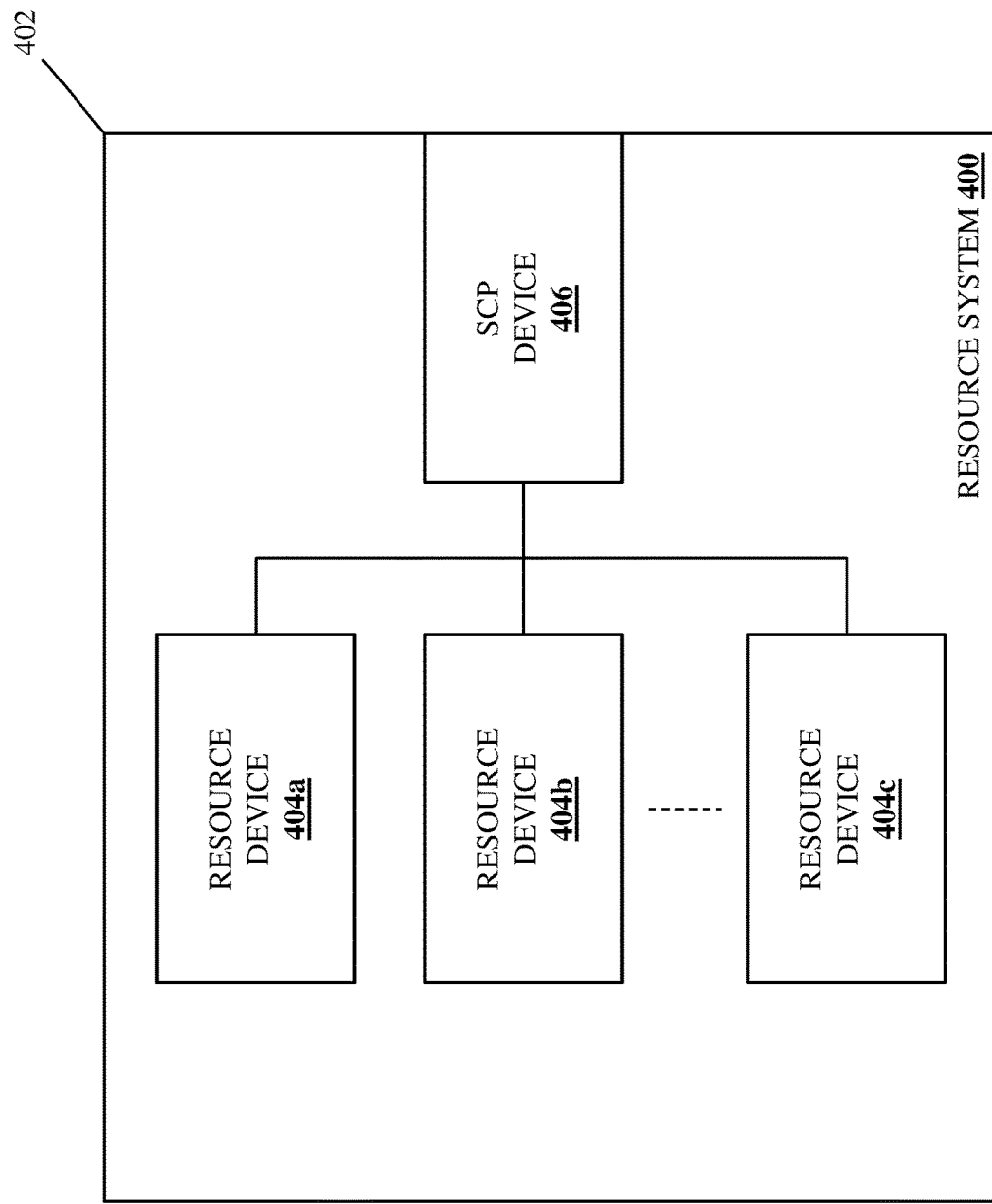
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)@ Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (IO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. Thus, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
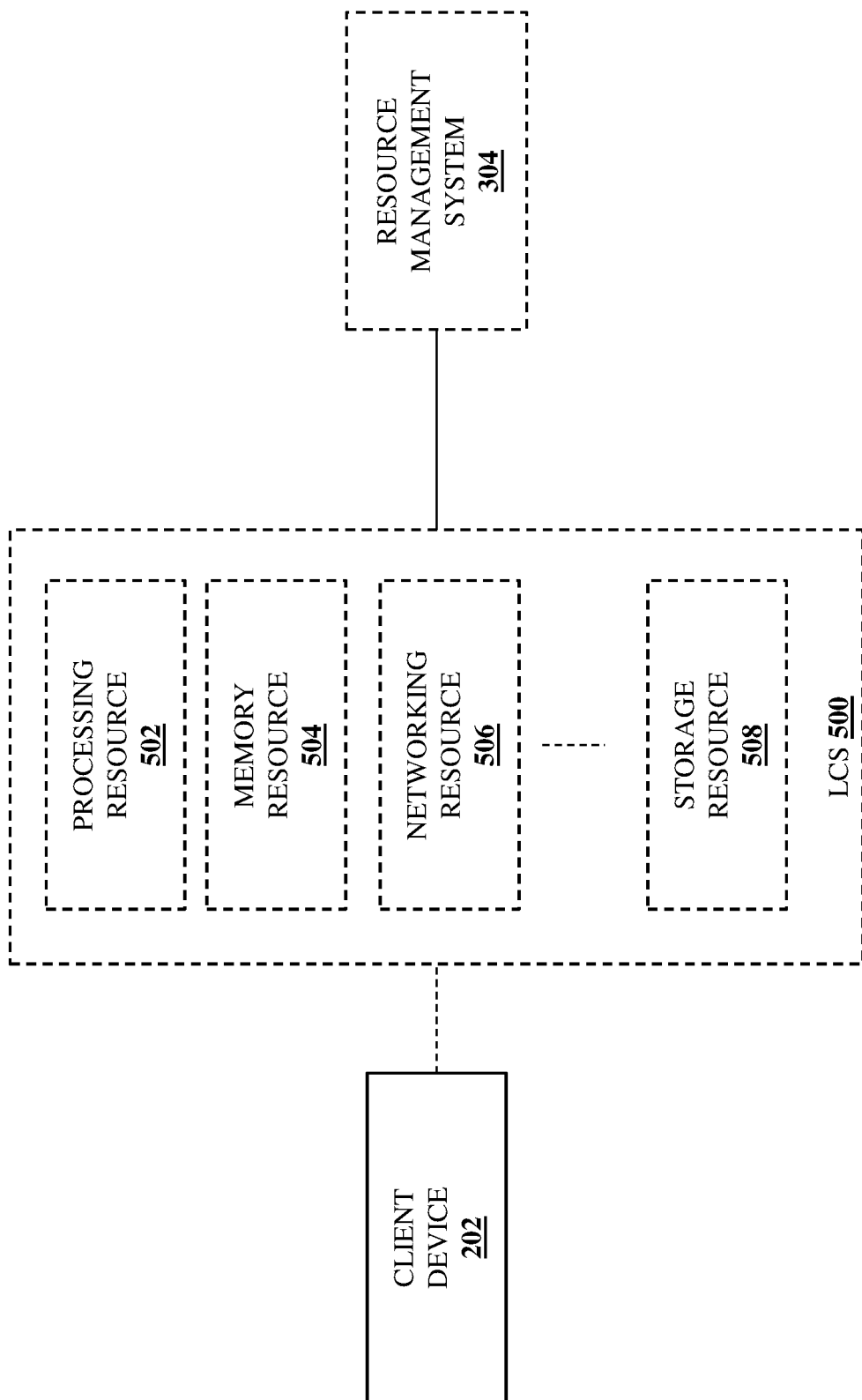
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
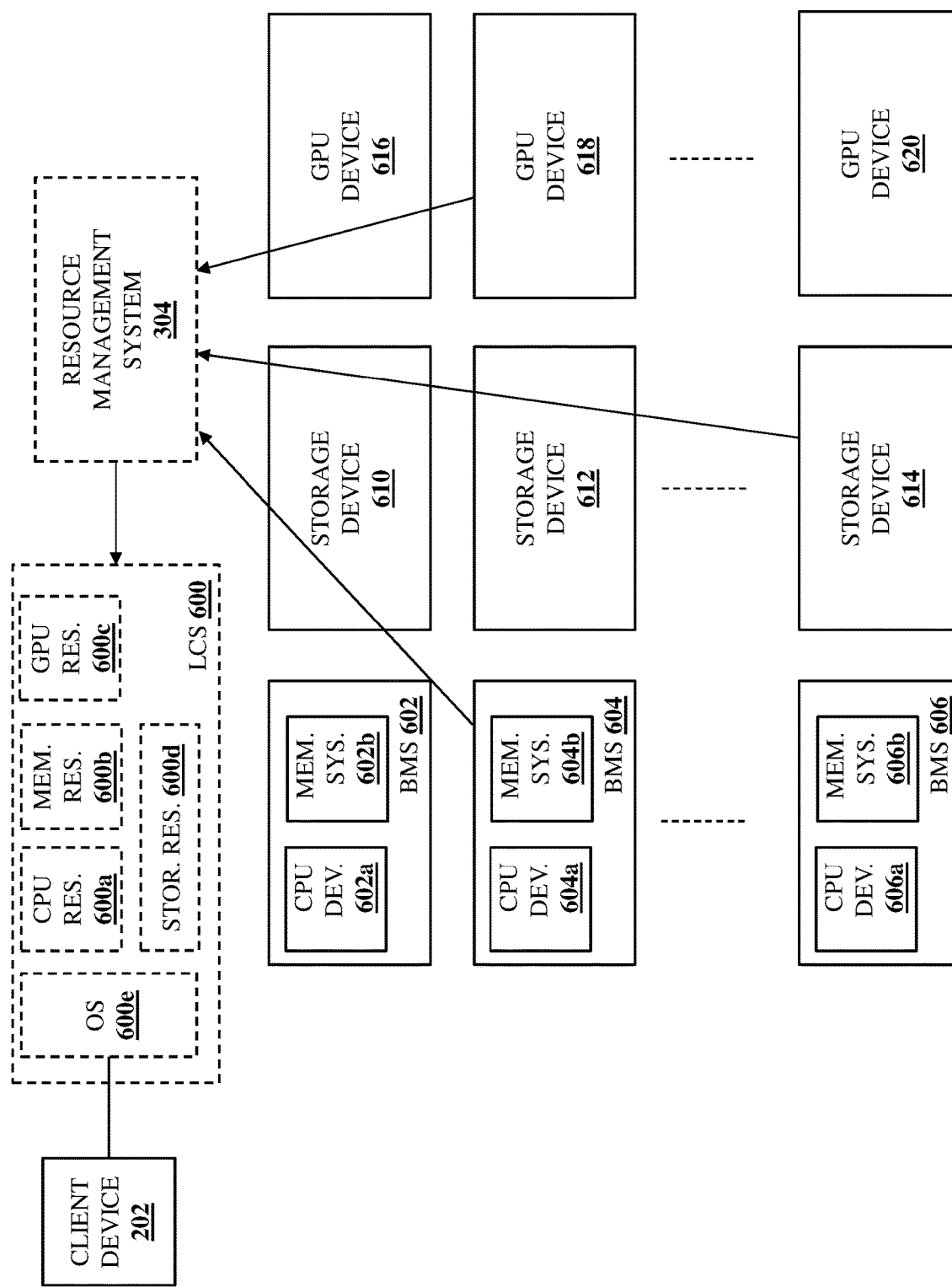
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/ CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/ time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
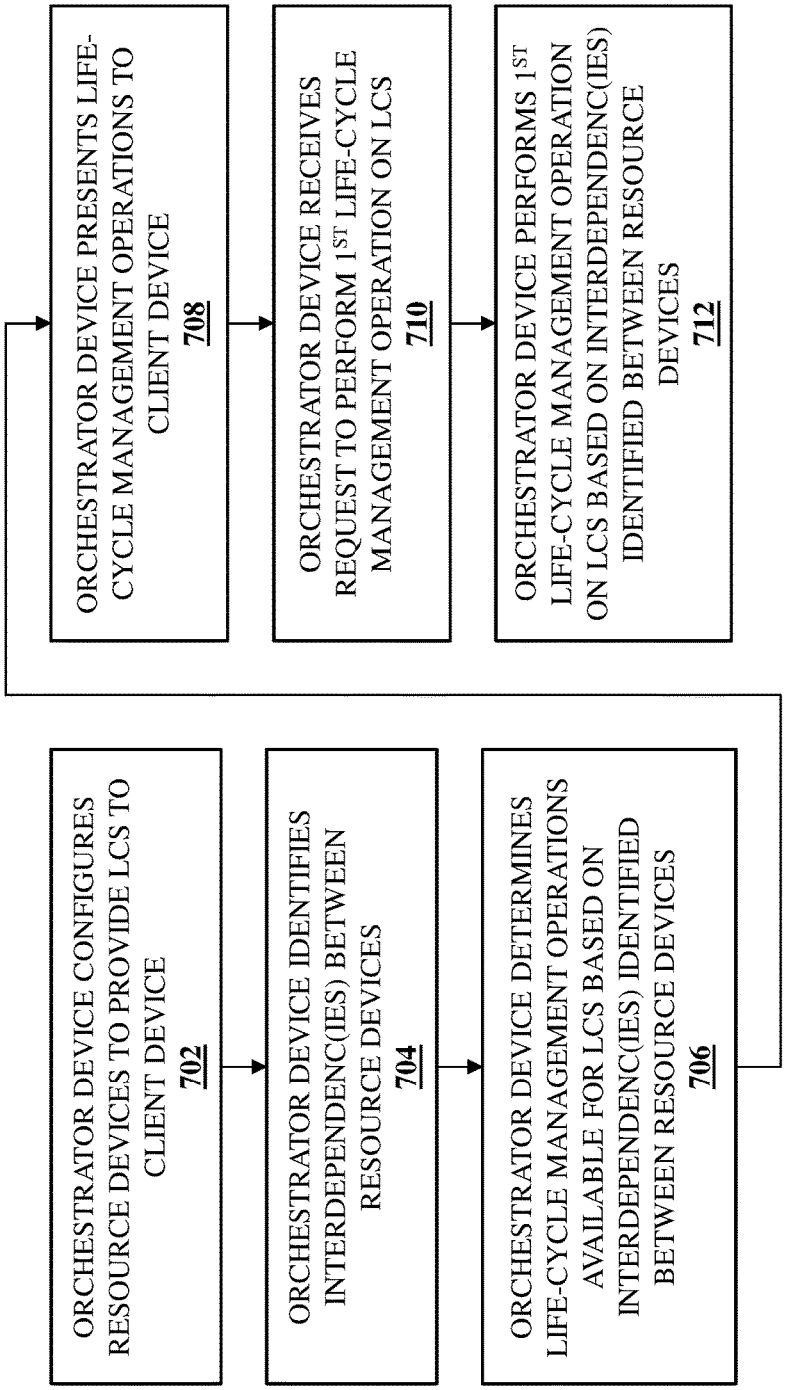
FIG. 7 is a flow chart illustrating an embodiment of a method for providing life-cycle management for an LCS.

Referring now to FIG. 7, an embodiment of a method 700 for providing life-cycle management for a Logically Composed System (LCS) is illustrated. As discussed below, the systems and methods of the present disclosure provide for the determination of life-cycle management operations available for an LCS provided to a client device based on interdependencies between a plurality of resource devices that are being used to provide that LCS, along with the presentation of those life-cycle management operations to the client device to allow it to request the performance of those life-cycle management operations on the LCS. For example, the LCS life-cycle management system of the present disclosure may include an orchestrator device coupled to resource devices. The orchestrator device configures the resource devices to provide an LCS to a client device. The orchestrator device also identifies interdependencies between the resource devices and, based on those interdependencies, determines life-cycle management operations available for the LCS and presents the life-cycle management operations to the client device. When the orchestrator device receives a request to perform a first life-cycle management operation on the LCS, it performs the first life-cycle management operation on the first LCS based on the interdependencies identified between the resource devices. As such, life-cycle management for LCSs composed (and dynamically recomposed) using different resource devices, as well as resource devices shared between LCSs, is enabled for the client devices to which those LCSs are provided.

As discussed above, the inventors of the present disclosure have determined that life-cycle management operations for an LCS composed from a plurality of resource devices present difficulties due to the interdependencies between the different resource devices that may be based on their different services, systems, and components that may provide various unique and interdependent functionality that is used to provide the LCS. Furthermore, control of such life-cycle management operations at scale (e.g., when the datacenters above are utilized to provide a plurality of LCSs to different client devices in different domains) will be complicated if Application Programming Interface (API) calls for life-cycle management operations are required by client devices for any particular LCS provided via any particular combination of resource device functionality. As such, the systems and methods of the present disclosure implement the method 700 to identify interdependencies between resource devices to determine which life-cycle management operations are available for an LCS, and use those interdependencies to accomplish those life-cycle management operations when they are requested by client devices.

As such, the systems and methods of the present disclosure may present a client device a variety of life-cycle management operations available for an LCS it is being provided, and may maintain those available life-cycle management operations as the resource devices used to provide the LCS change, while also tailoring the available life-cycle management operations to the user of the client device. As will be appreciated by one of skill in the art in possession of the present disclosure, the delivery of life-cycle management operations to the client device in such a manner abstracts the functionality performed by the resource devices in providing for LCS life-cycle management via the presentment of the life-cycle management operations based on the interdependencies that are identified between the resource devices and their functionality, which may be used to define different sequences of operations by the resource devices/functionality in order to accomplish different life-cycle management operations. Furthermore, the interdependencies identified between the resource devices may indicate the impact of any life-cycle management operation on a first LCS with respect to any second LCS(s) that share resource devices with the first LCS, and the performance of any of those life-cycle management operations may take into account those interdependencies in order to minimize that impact.

Figure 8A:
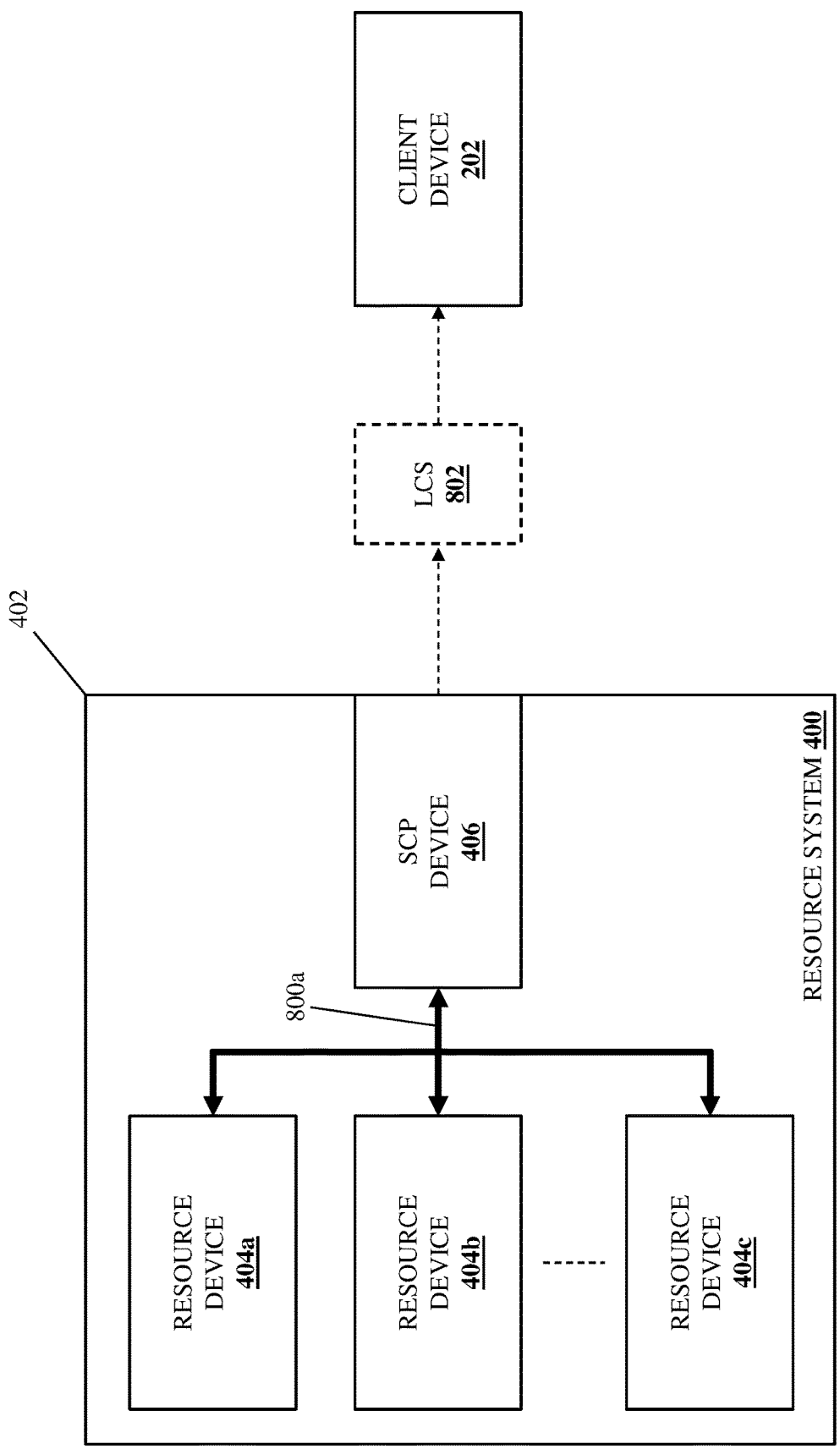
FIG. 8A is a schematic view illustrating an embodiment of the resource system of FIG. 4 operating during the method of FIG. 7.

The method 700 begins at block 702 where an orchestrator device configures resource devices to provide an LCS to a client device. With reference to FIG. 8A, in an embodiment of block 702, the SCP device 406 in the resource system 400 may perform resource device configuration operations 800*a* that include configuring the resource devices 404*a*-404*c* in the resource system 400 to provide an LCS 802 to the client device 202. For example, as discussed above, the client device 202 may provide a workload intent for a workload to the resource management system 304 that causes the resource management system 304 to compose an LCS using the resource devices 404*a*-404*c* in the resource system 400, followed by the SCP device 406 in the resource system 406 configuring those resource devices 404*a*-404*c* to provide the LCS 802 to the client device 202.

However, as will be appreciated by one of skill in the art in possession of the present disclosure, the embodiment illustrated in FIG. 8A and utilized in the examples below presents a simplified example of the provisioning of the LCS 802 using the resource devices 404*a*-404*c* in a single resource system 400. For example, other embodiments may include the SCP device 406 configuring resource devices both within its resource system 400 and outside its resource system 400 to provide the LCS 802, configuring resource devices that are included on the SCP device 406 to provide the LCS 802, and/or configuring any other resource devices discussed above to provide the LCS 802. Furthermore, while the SCP device 406 is illustrated and described in the examples below as providing the orchestrator device in the LCS life-cycle management system of the present disclosure, as discussed above the SCP device 406 may be replaced by DPU devices and/or other orchestrator devices while remaining within the scope of the present disclosure as well.

Figure 8B:
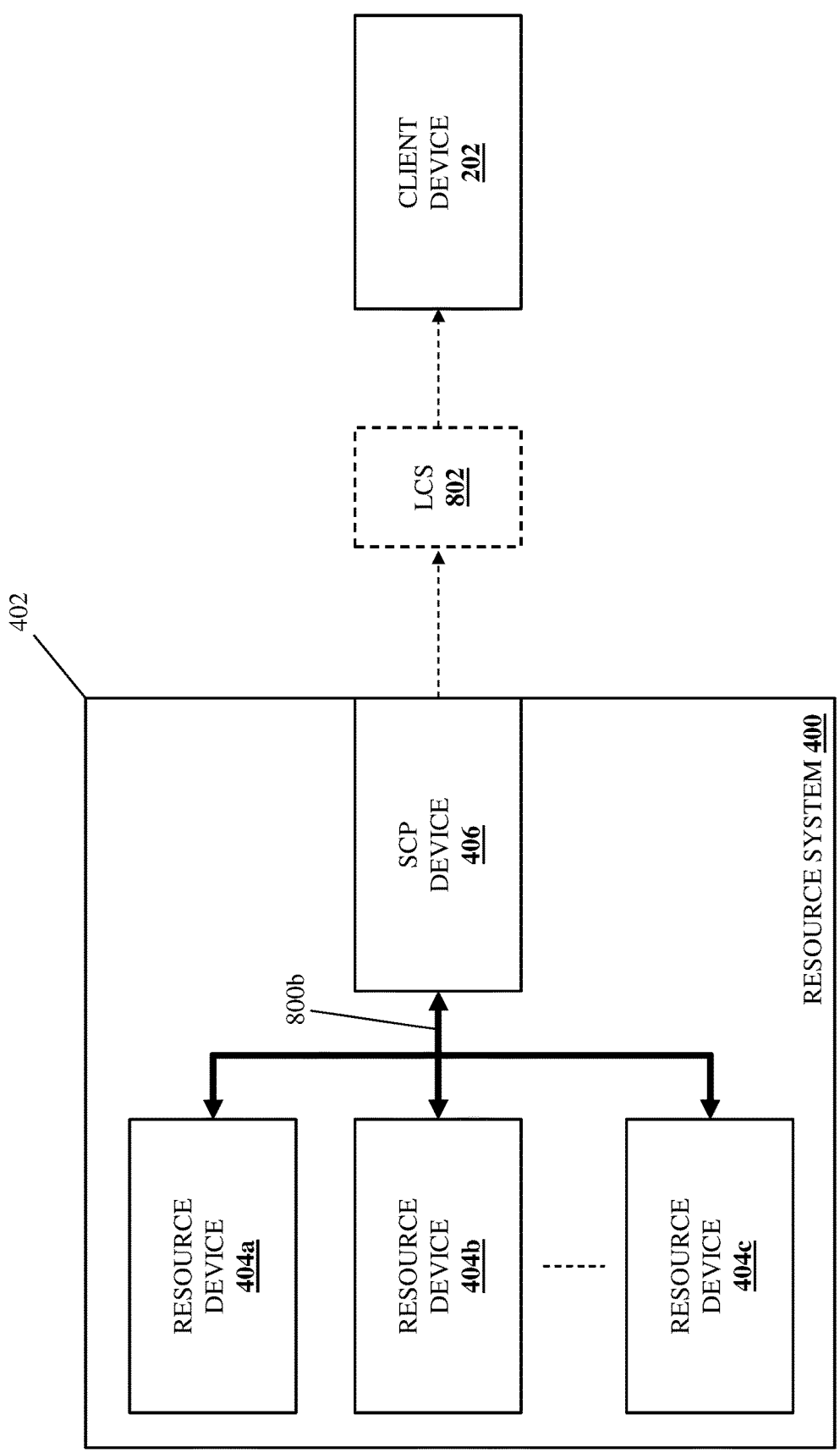
FIG. 8B is a schematic view illustrating an embodiment of the resource system of FIG. 4 operating during the method of FIG. 7.

The method 700 then proceeds to block 704 where the orchestrator device identifies one or more interdependencies between the resource devices. With reference to FIG. 8B, in an embodiment of block 704, the SCP device 406 in the resource system 400 may perform resource device interdependency determination operations 800*b* that include identifying interdependencies between the resource devices 404*a*-404*c* in the resource system 400 that were configured to provide the LCS 802 to the client device 202. As will be appreciated by one of skill in the art in possession of the present disclosure, any of the resource devices 404*a*-404*c* being used to provide the LCS 802 may include particular components and/or may perform particular functionality that may be dependent on one or more of the other resource devices 404*a*-404*c*, and thus life-cycle management operations for the LCS 802 may require particular sequencing of operations performed by any subsets of the resource devices 404*a*-404*c* in order to accomplish those life-cycle management operations. Furthermore, while the resource device interdependency determination operations 800*b* are illustrated and described as being performed subsequent to the resource device configuration operations 800*a*, one of skill in the art in possession of the present disclosure in the art in possession of the present disclosure will appreciate how the configuration of the resource devices and the determination of their interdependencies may be performed at the same time while remaining within the scope of the present disclosure as well.

As will be appreciated by one of skill in the art in possession of the present disclosure in the art in possession of the present disclosure, life-cycle management operations for an LCS may include LCS create life-cycle management operations, LCS delete life-cycle management operations, LCS update life-cycle management operations, LCS configuration life-cycle management operations, LCS reset life-cycle management operations, LCS restart life-cycle management operations, LCS start life-cycle management operations, LCS stop life-cycle management operations, LCS power-on life-cycle management operations, and LCS power-off life-cycle management operations. As discussed above, any of the life-cycle management operations discussed above may require that the operations by any subset of the resource devices 404*a*-404*c* to accomplish that life-cycle operation be performed in a particular sequence, with that particular sequence dictated by the interdependencies between that subset of the resource devices 404*a*-404*c*. To provide a specific example, the LCS restart life-cycle management operations discussed above may be associated with a "dependency graph" in order to shut down the LCS 802 and then restart it, with the dependency graph dictating sequence(s) and operation(s) to perform using the resource devices 404*a*-404*c* in order to accomplish that shut down and restart.

As discussed above, conventional computing devices such as server devices enable relatively straight forward life-cycle management operations due to the static nature of their components and configuration. For example, the restart operations discussed above may be enabled in a server device via a "hard reset" that causes each of the components in the server device to restart in a defined sequence. However, given the disaggregated and often shared nature of the resource devices used to provide an LCS, any life-cycle management operation for that LCS may require coordination and proper sequencing of the corresponding resource device operations that are necessary to accomplish that life-cycle management operation while ensuring that the life-cycle management operation is performed correctly and does not affect other LCSs that may be utilizing any of those resource devices as well. As such, one of skill in the art in possession of the present disclosure in the art in possession of the present disclosure will appreciate how any of a variety of interdependencies between the resource devices 404a-404c may be identified at block 804 that would affect how a life-cycle management operation for the LCS provided using those resource devices 404a-404c may be accomplished.

To provide a specific example, in order to perform a firmware upgrade (e.g., a BIOS upgrade) on a BMS system, a reboot of the BMS system will be required. As discussed above, such a BMS system may provide multiple LCSs, and one of skill in the art in possession of the present disclosure will appreciate how each LCS may include one or more clients/users. As such, each of the clients, LCSs, and BMS may be considered interdependencies of the reboot of the BMS system. One of skill in the art in possession of the present disclosure will appreciate how an LCS having a single client may have no interdependencies, while changing a connected resource device may only impact LCS that are depending on that resource device at that time, and thus situations exist where interdependencies are non-existent or minimal. However, in any interdependency situation, the orchestrator device may operate to determine the interdependencies associated with any lifecycle management operation, identify the sequencing and impacted resource devices, develop a lifecycle management operation execution plan that mitigates the interdependencies discussed above, and execute the lifecycle management operation while maintaining any lifecycle management (or other) policies, thus allowing the lifecycle management operation to be performed.

The method 700 then proceeds to block 706 where the orchestrator device determines life-cycle management operations available for the LCS based on the one or more interdependencies identified between the resource devices. In an embodiment, at block 706, the SCP device 406 may use the interdependencies identified between the resource devices 404a-404c at block 704 to determine life-cycle management operations that are available from the LCS 802 being provided to the client device 202. As will be appreciated by one of skill in the art in possession of the present disclosure in the art in possession of the present disclosure, in some embodiments the interdependencies identified between the resource devices 404a-404c may allow any life-cycle management operations to be made available for the LCS 802. However, in other embodiments, the interdependencies identified between the resource devices 404a-404c may prevent at least some life-cycle management operations from being made available for the LCS 802. For example, an interdependency that includes the sharing of one or more of the resource devices 404a-404c with another LCS may prevent the LCS power-off operations or LCS restart operations discussed above (although some techniques are described below for allowing those particular life-cycle management operations to be performed for an LCS even when that LCS utilizes shared resource devices). As such, one of skill in the art in possession of the present disclosure in the art in possession of the present disclosure will appreciate that life-cycle management operations available for the LCS 802 may include any life-cycle management operations that allow the workload intent of the workload being performed by that LCS 802 to be maintained, while also not interfering with other LCSs that may be utilizing some of the resource devices being used to provide the LCS 802.

In some embodiments, the determination of the life-cycle management operations available for the LCS 802 may also be based on the user of the client device 202 to which the LCS 802 is being provided. For example, when determining the life-cycle management operations available for the LCS 802, the SCP device 406 may identify a user of the client device 202, and then determine the life-cycle management operations available for the LCS 802 based on the interdependencies identified between the resource devices 404a-404c and the user of the client device 202. As such, life-cycle management operations available for an LCS may also be determined by a user (or user role) of that LCS, which one of skill in the art in possession of the present disclosure in the art in possession of the present disclosure will recognize may operate to maintain user privileges when performing life-cycle management operations in a connected/configured LCS "stack" of resource devices.

As will be appreciated by one of skill in the art in possession of the present disclosure, lifecycle management operations may be governed based on a user of the LCS and/or a role of an operator that requests the LCS, and thus any particular LCS may have available (or have presented) particular lifecycle management operations that make sense to perform for that LCS, user, and/or requesting operator role. Such lifecycle management operation constraints may be considered a "self-describing" aspect of the LCS/life-cycle management relationship, as the entit(ies) creating and/or using the LCS may dictate many of the lifecycle management operations that will be available/presented for their LCS (e.g., only certain lifecycle management operations may be available/presented based on the user/operating role).

Figure 9A:
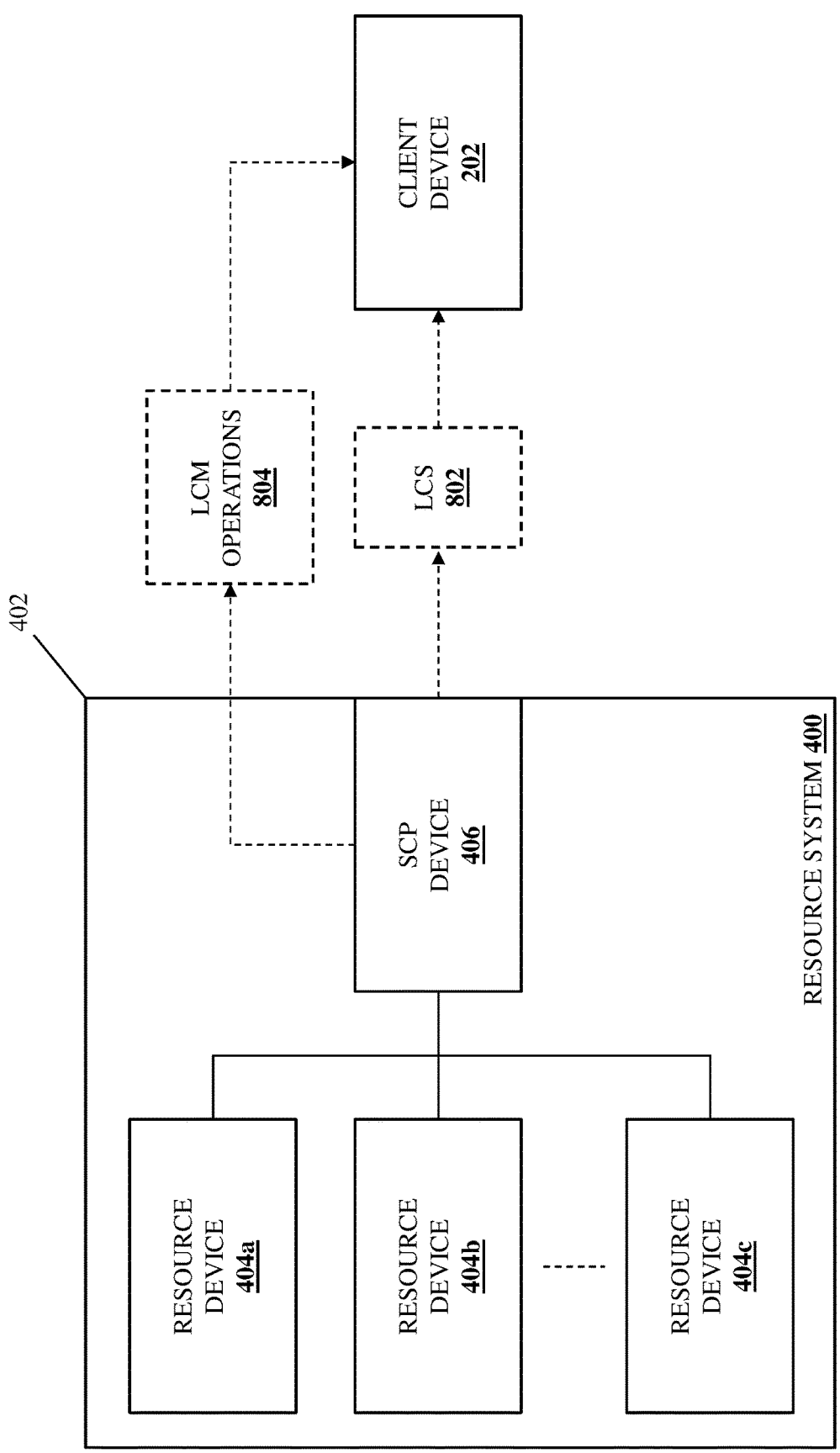
FIG. 9A is a schematic view illustrating an embodiment of the resource system of FIG. 4 operating during the method of FIG. 7.

The method 700 then proceeds to block 708 where the orchestrator device presents the life-cycle management operations to the client device. With reference to FIG. 9A, in an embodiment of block 708, the SCP device 406 may present life-cycle management (LCM) operations 804 available for the LCS 802 to the client device 202. For example, the operating system providing the LCS 802 may allow the client device 202 to request a menu of available life-cycle management operations and, in response to such a request, the SCP device 406 may present the LCM operations 804 to the client device 202. However, while a specific example of the presentment of LCM operations 804 to a client device 202 has been described, one of skill in the art in possession of the present disclosure will appreciate how life-cycle management operations available for an LCS may be presented in a variety of manners that will fall within the scope of the present disclosure as well. Furthermore, while the presentment of life-cycle management operations available for a single LCS to a single client device is illustrated and described, one of skill in the art in possession of the present disclosure will appreciate that the SCP device 406 may provide different LCSs for a plurality of different client devices, and thus may identify and present the different life-cycle management operations available for each of those different LCSs to each of those client devices while remaining within the scope of the present disclosure.

As discussed above, the resource devices utilized by the SCP device 406 to provide the LCS 802 may dynamically change for any of a variety of reasons (e.g., a first GPU device may be used to provide GPU resources for the LCS

802 during a first time period, while a second GPU device may be used to provide those GPU resource for the LCS 802 during a second time period.) As such, the identification of the interdependencies between the resource devices being used to provide the LCS 802 may be performed periodically (e.g., any time one or more resource devices being used to provide the LCS change), and thus the life-cycle management operations available for the LCS 802 and presented to the client device 202 may change as the resource devices being used to provide the LCS 802, or the interdependencies between, change. Thus, the SCP device 406 may identify whenever interdependencies between the resource devices being used to provide the LCS 802 have changed and, based on that identification, modify the LCM operations 804 available for the LCS 802 to provide modified LCM operation(s) available for the LCS 802, and present the modified LCM operation(s) to the client device 202.

Figure 9B:
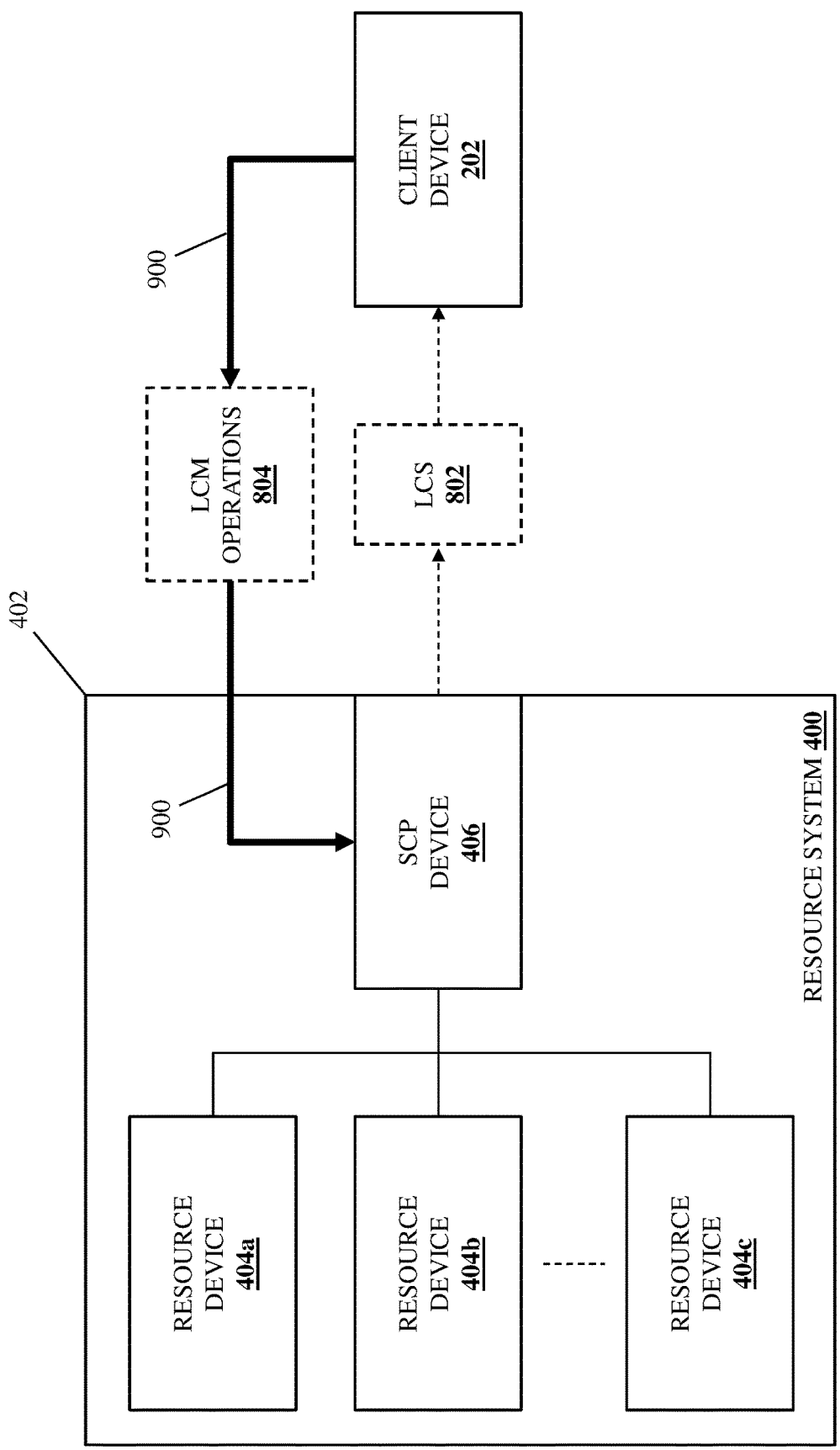
FIG. 9B is a schematic view illustrating an embodiment of the resource system of FIG. 4 operating during the method of FIG. 7.

The method 700 then proceeds to block 710 where the orchestrator device receives a request to perform a first life-cycle management operation on the LCS. With reference to FIG. 9B, in an embodiment of block 710, the SCP device 406 may perform life-cycle management operation request receiving operations 900 that include the client device 202 selecting a life-cycle management operation presented to it in the LCM operations 804, resulting in a request to perform that life-cycle management operation being provided to the SCP device 406.

Figure 10:
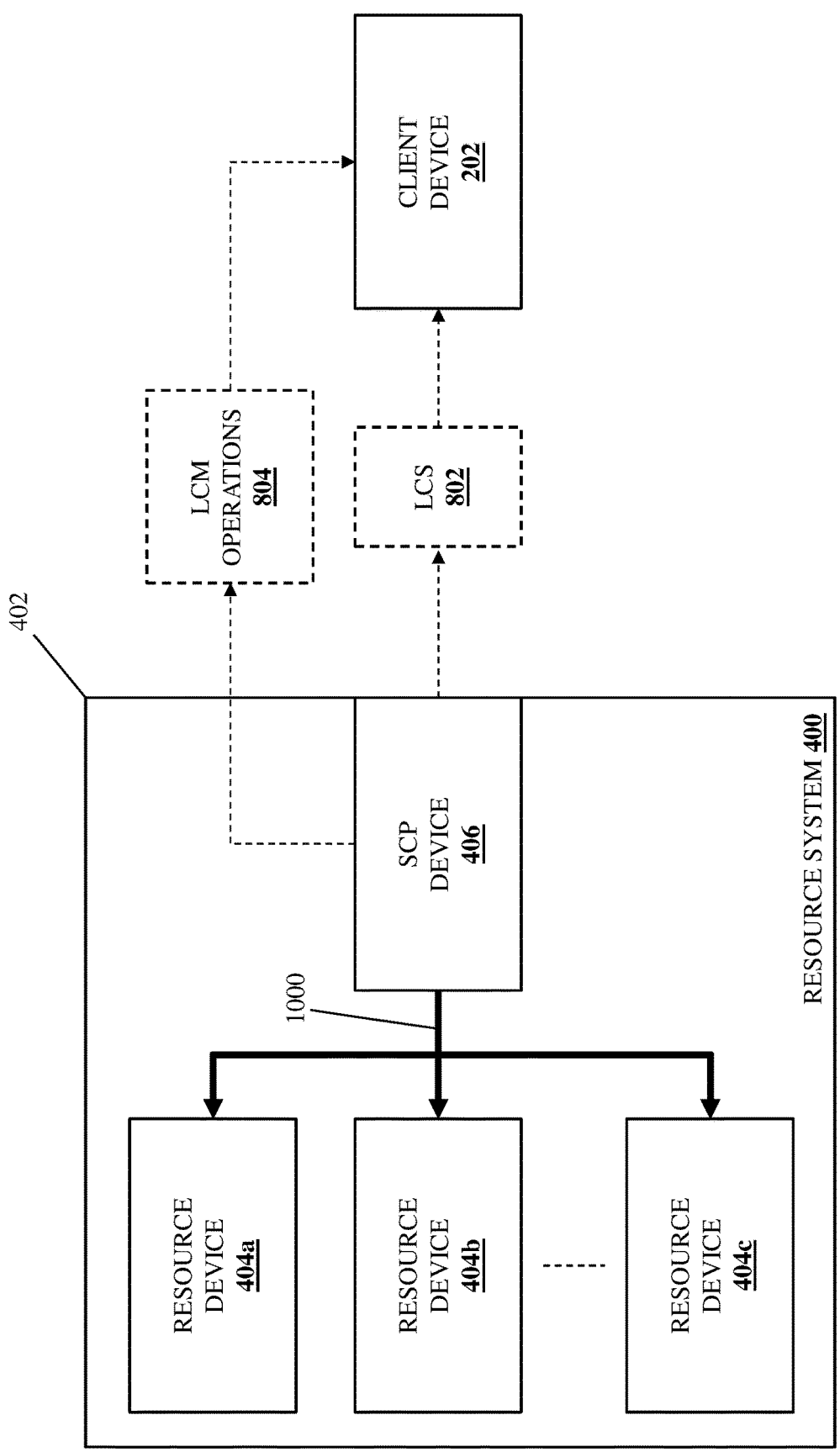
FIG. 10 is a schematic view illustrating an embodiment of the resource system of FIG. 4 operating during the method of FIG. 7.

The method 700 then proceeds to block 712 where the orchestrator device performs the first life-cycle management operation on the LCS based on the one or more interdependencies identified between the resource devices. With reference to FIG. 10, in an embodiment of block 712 and in response to receiving the request to perform the life-cycle management operation at block 710, the SCP device 406 may perform life-cycle management operation performance operations 1000 that include performing the requested life-cycle management operation based on the interdependencies between the resource devices 404a-404c that were identified at block 704 and determined to allow availability of that life-cycle management operations for the LCS 802. As such, the life-cycle management operation performance operations 1000 may include the SCP device 406 instructing any of the resource devices 404a-404c to perform respective operation(s) in a sequence that allows the life-cycle management operation to be accomplished on the LCS 802 in consideration of the interdependencies between those resource devices.

To provide a specific example of the performance of a requested life-cycle management operation on the LCS 802 based on the interdependencies identified between the resource devices 404a-404b, the interdependencies identified between the resource devices 404a-404c may identify that the resource device 404a is being used to provide another LCS. As such, the performance of the requested life-cycle management operation may include the SCP device 406 preventing the resource device 404a from being used to provide the other LCS, and then subsequently performing the requested life-cycle management operation on the LCS 802 (which may include an operation by the resource device 404a in order to accomplish the requested life-cycle management operation). Subsequent to performing the requested life-cycle management operation on the LCS 82, the SCP device 406 may then again use the resource device 404 to provide the other LCS. As such, while embodiments are discussed above in which the sharing of resource devices between LCSs may prevent life-cycle management operations such as LCS power-off life-cycle management operations or LCS reset life-cycle management operations, the techniques discussed above can allow such interdependencies to still allow those life-cycle management operations by dynamically recomposing LCSs in order to ensure that a life-cycle management operation does not prevent either of the LCSs using a resource device from satisfying the workload intent of the workload for which they were composed.

In some embodiments, any life-cycle management operations available for an LCS may include an abstracted "base class" of life-cycle management operations that the SCP device 406 will configure for any LCS that is provided. As such, in some examples, the SCP device 406 may operate with the resource management system 304 to compose any LCS from resource devices that include interdependencies that allow that base class of life-cycle management operations to be performed for that LCS, while other resource device that are available may be used to compose the LCS in order to enable other life-cycle management operations that may be added to the base class life cycle management operations. As will be appreciated by one of skill in the art in possession of the present disclosure, such techniques for providing life-cycle management operations for LCSs allows those LCSs to be provided life-cycle management operations in a consistent manner while also allowing LCS-specific life-cycle management operations via more advanced resource devices (e.g., when the interdependencies introduced by those more advanced resource devices allow it). While not described in detail above, one of skill in the art in possession of the present disclosure will appreciate how the SCPM devices discussed above may invoke life-cycle management operations available for an LCS via a network, thus providing for independent life-cycle management operation performance (i.e., independent of the client device for which that LCS is provided) as long as the SCP device presenting those life-cycle management operations is reachable via the network.

Thus, systems and methods have been described that provide for the determination of life-cycle management operations available for an LCS provided to a client device based on interdependencies between a plurality of resource devices that are being used to provide that LCS, along with the presentation of those life-cycle management operations to the client device to allow it to request the performance of those life-cycle management operations on the LCS. For example, the LCS life-cycle management system of the present disclosure may include an orchestrator device coupled to resource devices. The orchestrator device configures the resource devices to provide an LCS to a client device. The orchestrator device also identifies interdependencies between the resource devices and, based on those interdependencies, determines life-cycle management operations available for the LCS and presents the life-cycle management operations to the client device. When the orchestrator device receives a request to perform a first life-cycle management operation on the LCS, it performs the first life-cycle management operation on the first LCS based on the interdependencies identified between the resource devices. As such, life-cycle management for LCSs composed (and dynamically recomposed) from different resource devices, as well as resource devices shared between LCSs, is enabled for the client devices to which those LCSs are provided.

As such, the systems and methods of the present disclosure may identify and present dynamic life-cycle management operations based on the currently available resource devices and their corresponding interdependencies, with life-cycle management operations exposed to the client device as they are identified as being available for the LCS via a common interface with any other life-cycle management operations that are currently available for that LCS, allowing changing life-cycle management capabilities as the LCS is dynamically provided using different resource devices. As discussed above, available life-cycle management operations may be based on a user of the client device as well as the interdependencies between the resource devices that provide that LCS, and may be exposed to the client devices as capabilities of the LCS (e.g., selectable life-cycle management operations). As such, life-cycle management operations provided via interdependent resource devices may be associated with dependency graphs that define the sequence(s) of resource devices/functionality that are required to accomplish the life-cycle management operation, thus enabling life-cycle management operations to be instantiated using those dependency graphs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) life-cycle management system, comprising:
    a plurality of resource devices; and
    an orchestrator device that is coupled to the plurality of resource devices and that is configured to:
        configure the plurality of resource devices to provide a first Logically Composed System (LCS) to a first client device, wherein at least one of the plurality of resource devices is configured to provide a second LCS to a second client device;
        identify one or more interdependencies between the plurality of resource devices that are based on the plurality of resource devices being configured to provide the first LCS to the first client device while the at least one of the plurality of resource devices is configured to provide the second LCS to the second client device;
        determine, based on the one or more interdependencies identified between the plurality of resource devices, a plurality of life-cycle management operations that are available for the first LCS and that will not interfere with the provisioning of the second LCS to the second client device;
        present the plurality of life-cycle management operations to the first client device;
        receive a request to perform a first life-cycle management operation that is included in the plurality of life-cycle management operations on the first LCS; and
        perform, in response to the request and based on the one or more interdependencies identified between the plurality of resource devices, the first life-cycle management operation on the first LCS using at least some of the plurality of resource devices without interfering with the provisioning of the second LCS to the second client device.

2. The system of claim 1, wherein the orchestrator device is included in a resource system with at least one of the plurality of resource devices.

3. The system of claim 1, wherein the plurality of life-cycle management operations include at least one of a create life-cycle management operations, a delete life-cycle management operation, an update life-cycle management operation, a configure life-cycle management operation, a reset life-cycle management operation, a restart life-cycle management operation, a start life-cycle management operation, a stop life-cycle management operation, a power-on life-cycle management operation, or a power-off life-cycle management operation.

4. The system of claim 1, wherein the orchestrator device is configured to:
    identify a user of the first client device; and
    determine, based on the one or more interdependencies identified between the plurality of resource devices and the user of the first client device, the plurality of life-cycle management operations available for the first LCS.

5. The system of claim 1, wherein the performing the first life-cycle management operation on the first LCS based on the one or more interdependencies identified between the plurality of resource devices includes:
    determining, based on the one or more interdependencies identified between the plurality of resource devices, a sequence of the plurality of resource devices for use in performing the first life-cycle management operation on the first LCS; and
    performing the first life-cycle management operation on the first LCS using the sequence of the plurality of resource devices.

6. The system of claim 1, wherein the performing the first life-cycle management operation on the first LCS based on the one or more interdependencies identified between the plurality of resource devices includes:
    identifying a first resource device that provides the at least one of the plurality of resource devices that is configured to provide the second LCS to the second client device;
    preventing the first resource device from being used to provide the second LCS to the second client device;
    performing, subsequent to preventing the first resource device from being used to provide the second LCS to the second client device, the first life-cycle management operation on the first LCS; and
    enabling, subsequent to performing the first life-cycle management operation on the first LCS, the use of the first resource device to provide the second LCS to the second client device.

7. An Information Handling System (IHS), comprising:
    a processing system; and
    a memory system that is coupled to the processing system and that includes instructions that, when executed by the processing system, cause the processing system to provide an orchestrator engine that is configured to:
        configure a plurality of resource devices to provide a first Logically Composed System (LCS) to a first client device, wherein at least one of the plurality of resource devices is configured to provide a second LCS to a second client device;
        identify one or more interdependencies between the plurality of resource devices that are based on the plurality of resource devices being configured to provide the first LCS to the first client device while the at least one of the plurality of resource devices is configured to provide the second LCS to the second client device;

determine, based on the one or more interdependencies identified between the plurality of resource devices, a plurality of life-cycle management operations that are available for the first LCS and that will not interfere with the provisioning of the second LCS to the second client device;

present the plurality of life-cycle management operations to the first client device;

receive a request to perform a first life-cycle management operation that is included in the plurality of life-cycle management operations on the first LCS; and perform, in response to the request and based on the one or more interdependencies identified between the plurality of resource devices, the first life-cycle management operation on the first LCS using at least some of the plurality of resource devices without interfering with the provisioning of the second LCS to the second client device.

8. The IHS of claim 7, wherein the processing system and the memory system are included in a resource system with at least one of the plurality of resource devices.

9. The IHS of claim 7, wherein the plurality of life-cycle management operations include at least one of a create life-cycle management operations, a delete life-cycle management operation, an update life-cycle management operation, a configure life-cycle management operation, a reset life-cycle management operation, a restart life-cycle management operation, a start life-cycle management operation, a stop life-cycle management operation, a power-on life-cycle management operation, or a power-off life-cycle management operation.

10. The IHS of claim 7, wherein the orchestrator engine is configured to:

identify a user of the first client device; and determine, based on the one or more interdependencies identified between the plurality of resource devices and the user of the first client device, the plurality of life-cycle management operations available for the first LCS.

11. The IHS of claim 7, wherein the performing the first life-cycle management operation on the first LCS based on the one or more interdependencies identified between the plurality of resource devices includes:

determining, based on the one or more interdependencies identified between the plurality of resource devices, a sequence of the plurality of resource devices for use in performing the first life-cycle management operation on the first LCS; and performing the first life-cycle management operation on the first LCS using the sequence of the plurality of resource devices.

12. The IHS of claim 7, wherein the performing the first life-cycle management operation on the first LCS based on the one or more interdependencies identified between the plurality of resource devices includes:

identifying a first resource device that provides the at least one of the plurality of resource devices that is configured to provide the second LCS to the second client device;

preventing the first resource device from being used to provide the second LCS to the second client device;

performing, subsequent to preventing the first resource device from being used to provide the second LCS to the second client device, the first life-cycle management operation on the first LCS; and enabling, subsequent to performing the first life-cycle management operation on the first LCS, the use of the first resource device to provide the second LCS to the second client device.

13. The IHS of claim 7, wherein the orchestrator engine is configured to:

identify that the one or more interdependencies between the plurality of resource devices have changed;

modify, based on identifying that the one or more interdependencies between the plurality of resource devices have changed, the plurality of life-cycle management operations available for the first LCS to provide at least one modified life-cycle management operation available for the first LCS;

present the modified life-cycle management operation to the first client device.

14. A method for providing life-cycle management for an Logically Composed System (LCS), comprising:

configuring, by an orchestrator device, a plurality of resource devices to provide a first Logically Composed System (LCS) to a first client device, wherein at least one of the plurality of resource devices is configured to provide a second LCS to a second client device;

identifying, by the orchestrator device, one or more interdependencies between the plurality of resource devices that are based on the plurality of resource devices being configured to provide the first LCS to the first client device while the at least one of the plurality of resource devices is configured to provide the second LCS to the second client device;

determining, by the orchestrator device based on the one or more interdependencies identified between the plurality of resource devices, a plurality of life-cycle management operations that are available for the first LCS and that will not interfere with the provisioning of the second LCS to the second client device;

presenting, by the orchestrator device, the plurality of life-cycle management operations to the first client device;

receiving, by the orchestrator device, a request to perform a first life-cycle management operation that is included in the plurality of life-cycle management operations on the first LCS; and performing, by the orchestrator device in response to the request and based on the one or more interdependencies identified between the plurality of resource devices, the first life-cycle management operation on the first LCS using at least some of the plurality of resource devices without interfering with the provisioning of the second LCS to the second client device.

15. The method of claim 14, wherein the orchestrator device is included in a resource system with at least one of the plurality of resource devices.

16. The method of claim 14, wherein the plurality of life-cycle management operations include at least one of a create life-cycle management operations, a delete life-cycle management operation, an update life-cycle management operation, a configure life-cycle management operation, a reset life-cycle management operation, a restart life-cycle management operation, a start life-cycle management operation, a stop life-cycle management operation, a power-on life-cycle management operation, or a power-off life-cycle management operation.

17. The method of claim 14, further comprising:

identifying, by the orchestrator device, a user of the first client device; and determining, by the orchestrator device based on the one or more interdependencies identified between the plurality of resource devices and the user of the first client device, the plurality of life-cycle management operations available for the first LCS.

18. The method of claim 14, wherein the performing the first life-cycle management operation on the first LCS based on the one or more interdependencies identified between the plurality of resource devices includes:
   determining, based on the one or more interdependencies identified between the plurality of resource devices, a sequence of the plurality of resource devices for use in performing the first life-cycle management operation on the first LCS; and
   performing the first life-cycle management operation on the first LCS using the sequence of the plurality of resource devices.

19. The method of claim 14, wherein the performing the first life-cycle management operation on the first LCS based on the one or more interdependencies identified between the plurality of resource devices includes:
   identifying a first resource device that provides the at least one of the plurality of resource devices that is configured to provide the second LCS to the second client device;
   preventing the first resource device from being used to provide the second LCS to the second client device;
   performing, subsequent to preventing the first resource device from being used to provide the second LCS to the second client device, the first life-cycle management operation on the first LCS; and
   enabling, subsequent to performing the first life-cycle management operation on the first LCS, the use of the first resource device to provide the second LCS to the second client device.

20. The method of claim 14, further comprising:
   identifying, by the orchestrator device, that the one or more interdependencies between the plurality of resource devices have changed;
   modifying, by the orchestrator device based on identifying that the one or more interdependencies between the plurality of resource devices have changed, the plurality of life-cycle management operations available for the first LCS to provide at least one modified life-cycle management operation available for the first LCS;
   presenting, by the orchestrator device, the modified life-cycle management operation to the first client device.

* * * * *